United States Patent [19]
Burke

[11] Patent Number: 5,098,023
[45] Date of Patent: Mar. 24, 1992

[54] HAND CAR WASH MACHINE

[75] Inventor: William P. Burke, Locust Valley, N.Y.

[73] Assignee: Leslie A. Cooper, New York, N.Y.

[21] Appl. No.: 234,349

[22] Filed: Aug. 19, 1988

[51] Int. Cl.⁵ ................................................ B08B 3/02
[52] U.S. Cl. ................................. 239/273; 239/304; 239/549; 134/123; 15/DIG. 2; 15/312.2
[58] Field of Search .............. 239/200, 207, 273, 279, 239/304, 305, 391, 397, 443, 444, 549; 134/56 R, 57 R, 58 R, 123; 15/DIG. 2, 312.2

[56] References Cited

U.S. PATENT DOCUMENTS

| | | | |
|---|---|---|---|
| 2,708,446 | 5/1955 | Phillips | 134/123 |
| 2,756,759 | 7/1956 | Swain | 134/123 |
| 2,987,067 | 6/1961 | Vani et al. | 134/123 |
| 3,263,341 | 8/1966 | Allen | 134/123 |
| 3,339,565 | 9/1967 | Williams | 134/123 |
| 3,409,030 | 11/1968 | Schmidt | 134/123 |
| 3,600,224 | 8/1971 | Stilwell | 15/312.2 |
| 4,207,643 | 6/1980 | Beer et al. | 15/DIG. 2 |
| 4,715,391 | 12/1987 | Scheller | 134/123 |

Primary Examiner—Andres Kashnikow
Assistant Examiner—Karen B. Merritt
Attorney, Agent, or Firm—Nolte, Nolte & Hunter

[57] ABSTRACT

An apparatus for assisting in the hand washing of cars. Several tubes semi-surround a vehicle path. Each tube has nozzles directed at the path. Each tube may be supplied with a different washing fluid. The tubes are mounted in a housing. A radio remote control actuates each fluid separately.

10 Claims, 11 Drawing Sheets

HAND CAR WASH MACHINE

FIELD OF INVENTION

The present invention relates to methods and apparatus for facilitating the hand-washing of automobiles and vehicles.

BACKGROUND OF INVENTION

In the car wash industry various expensive and complicated machines have been devised for washing automobiles. It has been found that something more than a high-pressure water spray is required to break the surface adhesion between dirt and the car's paint. Consequently, most mechanical systems have incorporated some form of brushes or wipers to brush off the dirt. The problem with such apparatus is that abrasives from the dirt accumulate on the brushes and the machines are incapable of providing the proper amount of pressure to all points of the car's surface in order to avoid damaging the paint surface with the abrasives that have accumulated in the brushes. Consequently, hand car washing is generally regarded as superior to machine washing.

The problem with hand car washing is it involves many steps, and generally takes about forty-five minutes per automobile. The car must first be wet with a hose, soaped up, wiped by hand, rinsed, and possibly rinsed again. Under most weather conditions the car must then be dried by hand to prevent disolved materials in the water from leaving spots on the car's finish when the water has air-dried.

SUMMARY OF INVENTION

The present invention is designed to streamline most of these steps so that they can be accomplished in a matter of three to five minutes, leaving the hand-wiping of soapy water to break the surface adhesion of the dirt as the only step that must be accomplished by hand.

The present invention is designed, when used in a dead-end bay, to be operated from a hand-held transmitter, inside or outside a car to be prepped for washing.

The apparatus includes a frame comprising primarily a drive-through arch, which houses five channels or tubes: a rinse channel, a soap channel, a wax channel, a dionized spot-free water channel, and a cosmoline or other factory coating remover channel.

At the top of this arch, a blower system comprising a curtain of surgical tubing and felt strips is stored, mounted and housed, and is lowered or contracted by a transmitter.

In addition to the blower and felt drag, our system provides for a "water whip", which is a specially designed rubber extrusion squeegee which can wipe the beaded water from all parts of the car in a few strokes.

Our final rinse cycle is designed to use deionized water so the car may drip dry spotless, without the necessity of hand rubbing cloths, etc.

All channels in the arch are equipped with PVC piping, to eliminate corrosion problems, along with brass jet nozzles.

All plumbing channels are separate to eliminate mixing of chemicals, water, etc., which prevents cycle overlap.

This arch is on wheels, so that when desired it can be rolled into several different working areas.

Three storage tanks are utilized for wax, soap, and cosmoline remover. A fourth tank can be used as a water reservoir.

Submersible pumps are to be used when appropriate in the chemical tanks, with an outside centrifugal pump to add additional water and pressure.

House air pressure, from the garage's pressurized air supply system, is used on the rinse, final rinse, and in the surgical tubing in the blower process.

Through the use of our special air and water gun, the invention can deliver the same high-pressure deionized water rinse anywhere there are cars to be prepped simply by hose extensions. This eliminates the necessity of portable pumps and deionized water bottles being pushed all over the premises for the same purpose.

A normal prep cycle for washing, rinsing, waxing and drying the car would be as follows:

The arch should be placed at the head (front) of the wash bay or area.

As the driver approaches, he would signal with his hand-held transmitter for high pressure rinse water and soap, each flowing onto the car from their own channels. Upon driving through the arch and receiving this application, the driver or prep man would turn off the cycles, get out of the car in the bay and go about the car with a mitt or scratch-free brush, emulsifying the soap on the car, which breaks the static hold of the dirt or material to be removed.

He would then get in the car, signal for a rinse cycle, and back out through the arch and high pressure rinse water.

If he wishes to put a coating of wax on the car, he can signal again with his hand-held transmitter and drive back through the arch and wax spray.

If he wishes he can now signal for the deionized final rinse cycle and back out through the shower of deionized water, which has all the minerals removed because of our filtration system on this channel. This car under normal conditions will then drip dry spot free.

If it is cold weather or overcast, to prevent the beaded up water from remaining on the car and gathering more dust, he can signal for the blower system to lower and the surgical tubing, as he drives back through the arch, will dance all over the car propelled by the high pressure air in the tubing. This will not only help in breaking up the beaded water, but will blow it off the car.

Behind the curtain of air-filled surgical tubing, the felt curtain will aid in pulling off any remaining water.

The driver, after parking the car, with our specially designed "water whip" hand-held squeegee, can in a few strokes remove any remaining water from the hood, top, trunk, windows and sides with just a few strokes.

Cosmoline, or other protective coating, can be removed by calling up a cleaning solution to be sprayed from our arch as the car passes through. This cycle is usually preferred before the wash, soap and wax system.

When space permits and the requirements are for large volumes of cars to be prepped, as in commercial car washes, our five channel arch can be separated and extended over a forty foot area so the car can be processed on a forward drive-through program, entering at the beginning and exiting at the end without the need for backing and going forward under the arch, as in the dead-end bay.

Our high pressure air and water gun can be utilized to blow off before washing heavy road grit such as salt, road sands, etc. This is especially helpful in cleaning out wheel wells and spoked wheel cars, and the bottom portions of rocker panels. When switched over to air alone, it can be used to blow out door panels and locks to keep them from freezing.

Our electrical system basically utilizes 110 volt alternating current. There is a transceiver which receives signals from the portable transmitter, and in turn relays them to plug-in modules.

Low voltage transformers reduce the current being sent to water valves which open and close in different channels as required, along with air control valves for the emission of air into the system.

The same module system is used to open electrical lines to our submersable pumps and main pressure pump, and controls the lowering and raising of the blower curtains, etc.

When a drive-through configuration for high volume car washing is utilized, the hand-held transmitter can be replaced by a terminal wand, which when contacted by the moving car, will start or stop each cycle as it proceeds through the program.

DETAILED DESCRIPTION OF THE DRAWINGS

Figure 1:
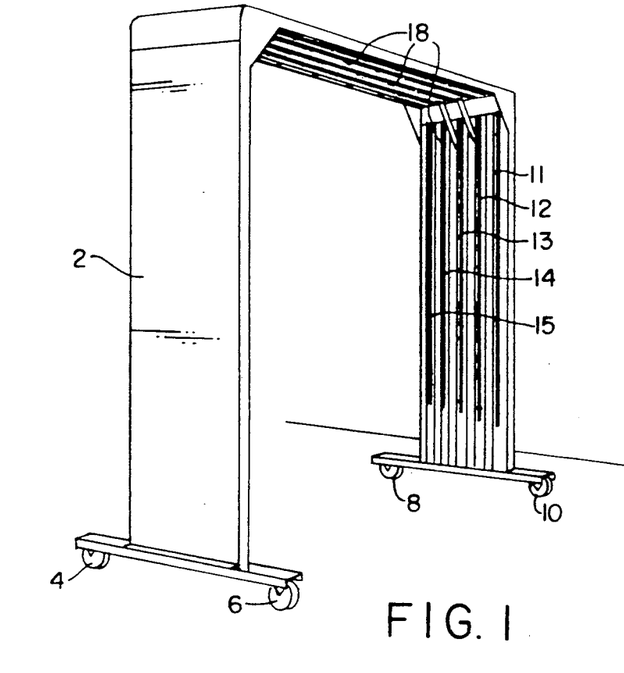
FIG. 1 is a perspective view of a spray arch of the present invention.
Figure 2:
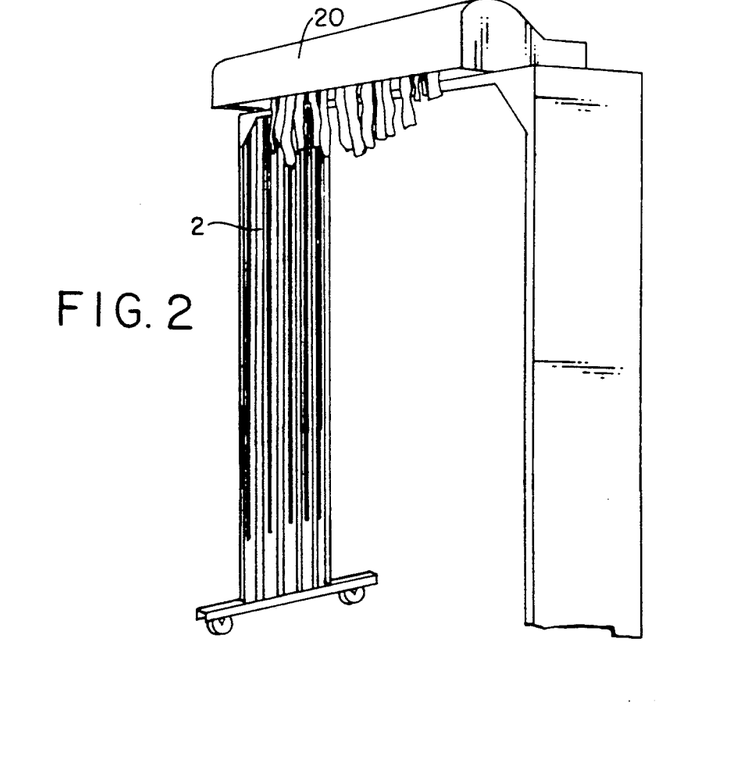
FIG. 2 is a perspective view showing a roller assembly and drying curtain atop the arch.
Figure 3:
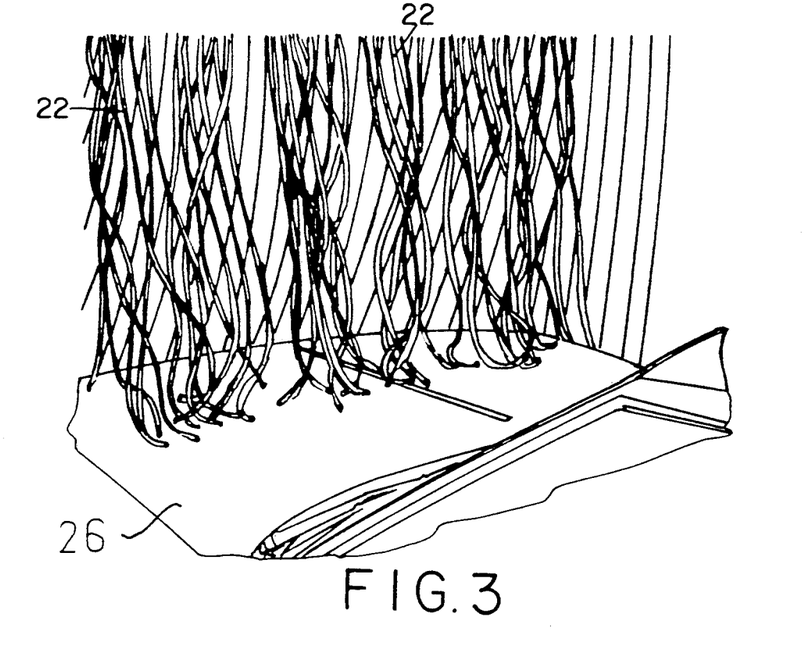
FIG. 3 is a perspective view of a blower tube curtain, in operation, blowing a car surface dry.
Figure 4:
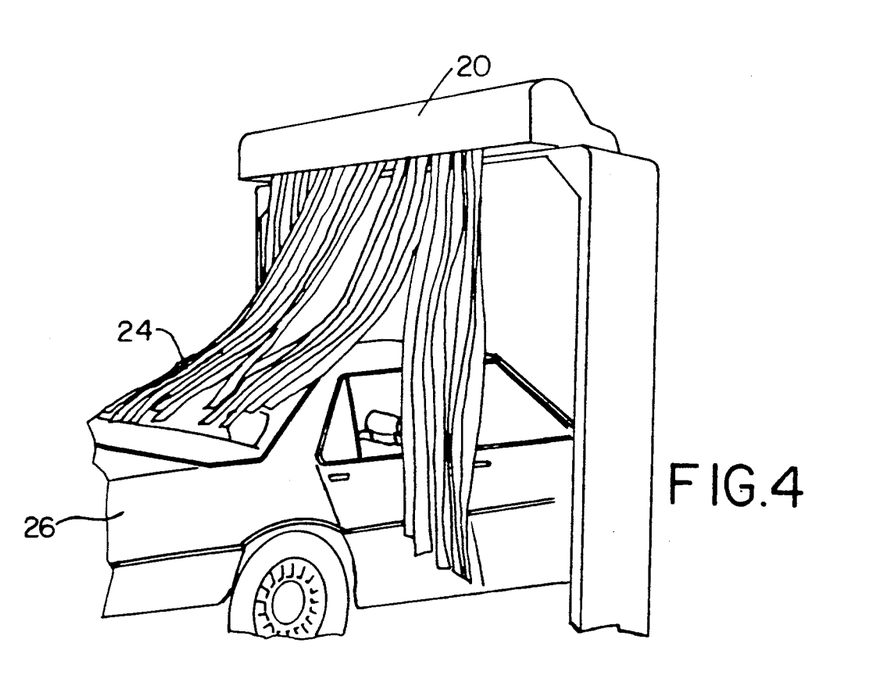
FIG. 4 is a perspective view of a felt drying strip curtain pulling water off a car.
Figure 5:
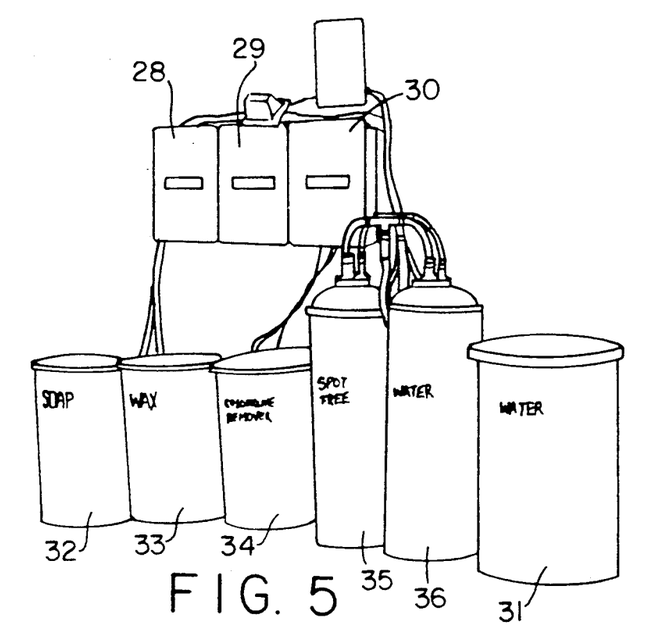
FIG. 5 is a view of the fluid dispensing system.
Figure 6:
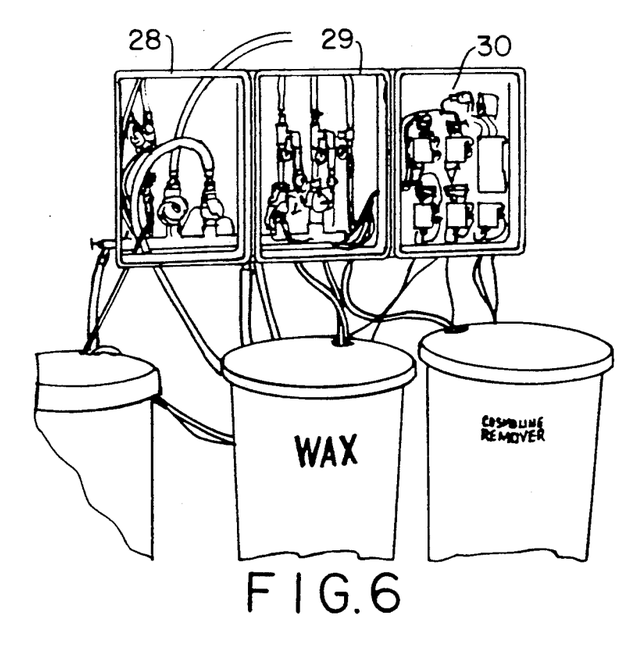
FIG. 6 is a view of the fluid dispensing system with fluid dispensing control boxes open.
Figure 7:
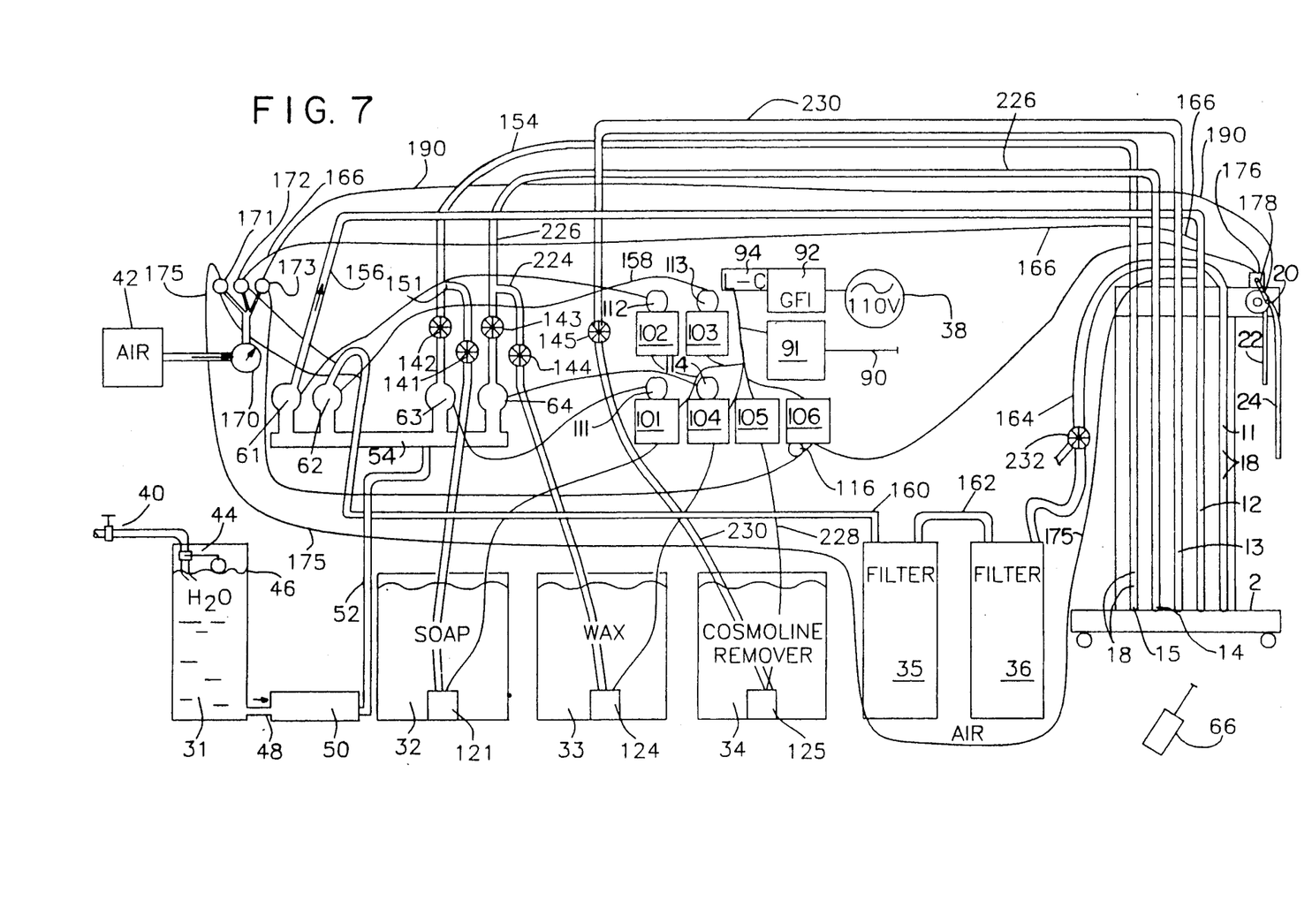
FIG. 7 is a block diagram of the system.

FIG. 1 shows a spray rack or arch, generally designated 2, of the present invention. Spray rack 2 is mounted on wheels 4, 6, 8, 10 for ease of portability. The spray rack or arch comprises a plurality of tubes 11-15, each of which extends from the bottom of one side of the arch over the top and down to the bottom of the other. Each of the tubes 11-15 include a plurality of spray nozzles 18 directed within the area enclosed by the arch in order to spray the various fluids upon vehicles being driven through the arch. FIG. 2 shows arch 2, on top of which is mounted a roller assembly as is shown more clearly in FIGS. 3 and 4. Roller assembly 20 deploys a plurality of flexible blower tubes 22 made of surgical tubing and a plurality of felt drying strips 24, both of which are used to remove excess water from vehicle 26. FIG. 5 shows the system which supplies fluids to the spray arch. It comprises two valve control boxes 28, 29 and a power control box 30. These are connected by various hoses to supply tanks 31-36. FIG. 6 shows the control boxes 28-30 open and illustrates the manner in which some of the tanks are connected by various hoses through the control boxes. FIG. 7 is a block diagram of the system showing the various fluid and electrical connections. 110-volt alternating current 38 is supplied from the usual sources. A source 40 of tap water is also required. An air supply 42 is usually available at garages and is also required in this system. Water comes in from source 40 through float valve 44 to fill water tank 31 to a predetermined level 46. Hose 48 supplies this tap water to high pressure pump 50 which is a one and one-half horsepower centrifugal pump capable of supplying fifty gallons per minute. Pump 50 pressurizes the water and supplies it through hose 52 to manifold 54. Manifold 54 distributes this water to a plurality of low voltage control valves 61-64 similar to those used to turn lawn sprinkler systems on and off.

Figure 8:
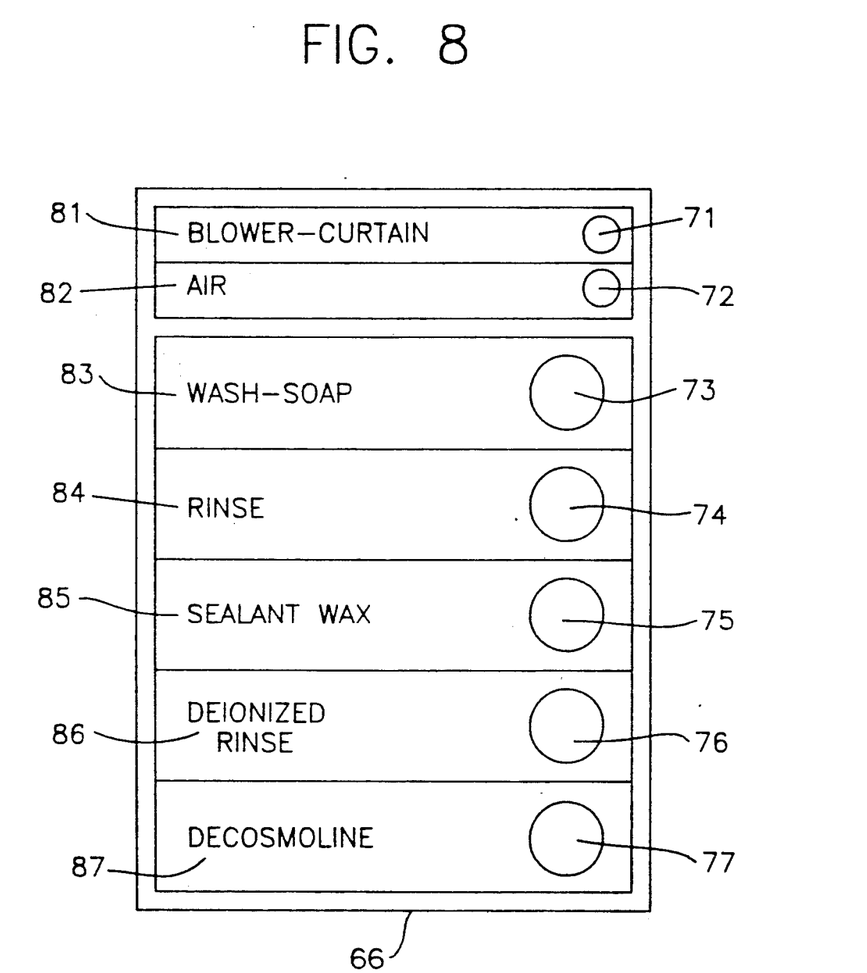
FIG. 8 is a front elevation of the control transmitter.

To use the system, the person washing the car will transmit a signal from radio transmitter 66. Transmitter 66 comprises buttons 71-77 (FIG. 8), each with its appropriate label 81-87. Each of these buttons 71-77 control a function of the system. As a first step, the wash person will get into the car holding the hand-held transmitter 66 and drive the car toward arch 2. As he nears arch 2, he will depress wash-soap button 73 which will cause transmitter 66 to transmit a signal to antenna 90 of transceiver 91. Transceiver 91 receives its electrical power from source 38 filtered through a ground fault interrupter 92 which protects persons, who may come into contact with stray current in the system, from being electrocuted. The electrical power is also filtered through a Radio Frequency Interference noise suppressor such as inductive-capacitive noise filter 94. The radio frequency noise filter 94 prevents unwanted radio signals from causing unwanted responses in the system. Upon receiving the signal, transceiver 91 broadcasts a radio carrier signal via the power supply lines to receiver/controllers 101 and 102. There are six receiver controllers 101-106 in the system. Control receiver-controllers 101, 102 supply power to transformers 111, 112 which are two of four transformers 111-114 in the system. Simultaneously controller 101 supplies 110 volt power to submersible soap pump 121. This is one of three submersible 20-gallon per minute centrifugal pumps 121, 124, 125. Pump 121 is actuated by the 110 volt power and it pumps soapy water through mixing valve 141 which has been preset to achieve a desired mixture of soap water and tap water. The soap water preferably contains an appropriate car wash detergent. Low voltage transformers 111, 112 simultaneously supplies voltage to flow valves 63, 61 causing valves 63, 61 to open. Valve 61 supplies rinse water through hose 156 to rinse tube 11. Valve 63 supplies tap water through mixture control valve 142. Tap water and soapy water mix at junction 151. The soap mixture then travels through hose 154 to arch 2 where it is injected into the top of soap tube 15 and thereby distributed to nozzles 18 disposed around the vehicle being driven therethrough. Rinse water and soapy water is thus applied to the vehicle. When the vehicle has been driven through, the driver depresses soap button 73 on his transmitter 66 which causes transceiver 91 to signal receiver 101 to stop applying power to pump 121 and to close valve 63, thus terminating the soap application spray.

The wash person then gets out of the car and wipes down the car with a wash cloth, towel, or the like. Hand-wiping breaks the static adhesion between the dirt and the paint surface of the vehicle and places the dirt in suspension in the soapy water. Valve 172 supplies air through hose 175 to the rinse tube during its cycle.

As the next step, the wash person climbs back in the car with transmitter 66 and backs the vehicle toward arch 2. He depresses rinse button 74 which, through transceiver 91, actuates controller 102 which supplies low voltage through transformer 112 which opens valve 61. Valve 61 supplies ordinary tap water from manifold 54 through rinse hose 156 to rinse tube 11 which sprays it through nozzles 18 on the car backing through the arch.

Ordinary tap water such as is used in this rinse cycle must generally be wiped from the car to prevent spotting as it evaporates and leaves behind deposits of minerals which had been dissolved in the water. To eliminate this problem, a rinse of deionized water is provided in this system. The washer, who is still in the car, drives forward toward the rack and depresses deionized rinse button 76 on transmitter 66 which, through transceiver 91, actuates the ionized water receiver controller 103, which supplies 110 volt AC to low voltage transformer 113, which supplies a low voltage through wires 158 to open valve 62, which supplies tap water from manifold 54 through hose 160 to filter 35. Filter 35 is a three and one-half cubic foot tank containing a mixed bed resin filter having both cationic resins and anionic resins. Such filter tanks are conveniently supplied by various water softener companies. From the outlet of tank 35, hose 162 supplies substantially deionized water through a second filter 36 which is similar to filter 35. Hose 164 supplies deionized water to the top of tube 12 where it is mixed with air from air hose 166. Air is supplied from source 42 through regulator 170 to three valves 171-173. Each valve is also controlled by low voltage from transformers 112, 113 and 116. Air is supplied to both rinse tubes during their cycles. Valve 171 supplies air to deionized rinse tube 12 during its cycle when transformer 113 is energized by controller 103.

Under good drying conditions and if wax is not desired, the process can end here. In weather where the water may undesirably freeze upon the car, or where poor drying conditions exist and the dionized water can pick up contaminants from the atmosphere, desolve those contaminants and leave them as spots, it is desirable to dry the vehicle. Toward this end a two part curtain is provided comprising blower tubes 22 and felt strips 24. This curtain is retractable upon a motor driven roller 20 which is mounted atop and in front of the rack. Roller 20 is driven by motor 176 via chain drive 178.

The wash person depresses blower curtain button 71, which, through transceiver 91, actuates receiver controller 106, which applies voltage to transformer 116, which transmits low voltage to open valve 173, which provides air through blower air hose 180 through a connector, which connects to a central shaft of roller 20.

Figure 9:
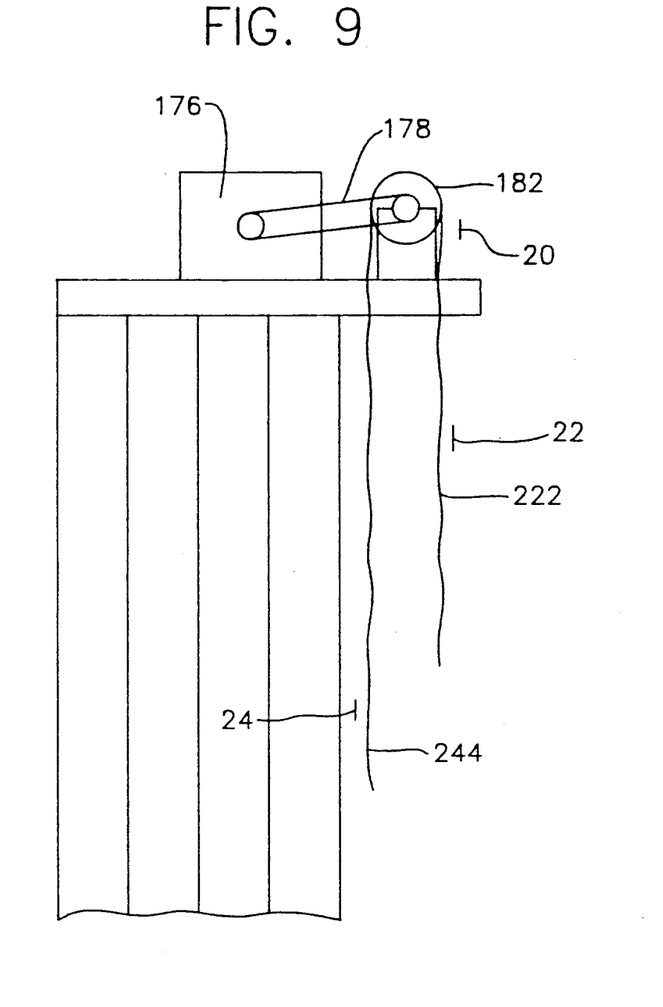
FIG. 9 is a side elevation of the drawing curtain assembly.
Figure 10:
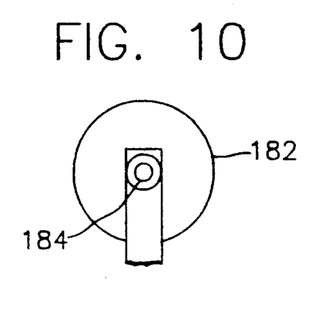
FIG. 10 is a side elevation of the drawing curtain roller.
Figure 11:
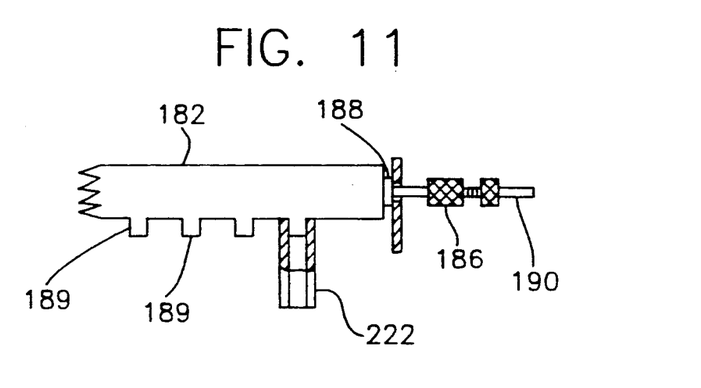
FIG. 11 is a front elevation of the drawing curtain roller.

This roller is shown in better detail in FIGS. 9, 10 and 11. FIG. 9 shows a cross-section of the roller which is a PVC pipe 182, capped and given rotational bearings at either end, and provided at one end with an air line assembly 184 comprising, as shown in FIG. 11, and air line connector 186 and a rotation valve 188. Protruding from a longitudinal line along the surface of the pipe are a plurality of brass nipples at one-inch-on-center spacings. A plurality of surgical tubes of similar length is installed as a curtain depending from pipe 182 by placing one end of each tube over a corresponding brass nipple. When the curtain is deployed, air from hose 190 passes through connector 186 and through rotation valve 188 to fill the sealed cylinder formed by PVC pipe 182 and its end caps. This pressurized air blows through the nipples 189 through the surgical tubes 222 and exits at fairly high pressure from the bottom of surgical tubes 222, causing them to dance upon the surface of the vehicle and blow the air at high pressure and close range at the water on the vehicle. This is an extremely effective technique for drying, because the directness of the blast disperses and evaporates the water very effectively. Mounted on pipe 182 (FIG. 9), one hundred and eighty degrees from the brass nipples, is a felt curtain 24 comprised of a series of felt strips which serve as drying towels. The felt strips extend about a foot beyond the bottoms of the surgical tubes.

Referring again to FIG. 8, when blower curtain button 71 is depressed on transmitter 66, the signal is received by transceiver 91 which actuates receiver controller 106 causing power to be applied in a lowering direction to motor 176, which rotates PVC 182 (FIG. 9) deploying it downwardly to its full length, at which point a timer stops the motor. The surgical tubes dance about as air sprays under pressure from their ends and the car drives through, being blasted and toweled dry in a manner which is non-abrasive.

When the car has been dried the operator can depress blower curtain button 71 again and the motor 176 will be actuated in the opposite direction as before so that the PVC pipe will roll up the blower dryer curtain. A timer stops motor 176 when the curtain is up.

Wax

As an additional step, wax may be applied. The wash person drives the car beneath the rack depressing the sealant/wax button 72 which through transeiver 91 actuates wax controller 104 opening valve 64 and operating pump 124 to supply water soluable wax mixed with tap water according to the proportions reset by adjusting dials 143 and 144. They are mixed at junction 224 and carried through hose 226 to wax tube 14 where they are sprayed on the car in the usual fashion. This leaves a wax coating which provides a shine on the surface of the car. This step preferably follows the tap water rinse and is followed by the deionized water rinse.

Cosmoline

When a new car dealer receives a car it is often covered by a protective coating of cosmoline or some sort of a acrylic lacquer. Various solvents are designed to remove cosmoline from a new car and we will refer to the application of these solvents as decosmolining. In order to decosmoline a car, the car should be run through the arch prior to washing. As the car approaches the arch the car washer depresses decosmoline button 77 which actuates, through transceiver 91, cosmoline receiver controller 105 which supplies power through wire 228 to centrifugal pump 125 which pumps the cosmoline remover through hose 230, passing through flow regulating valve 145 along the way, to decosmoline-tube 13 on rack 2. The car can then be wiped clean and washed in the manner described above.

Optionally the blower curtain motor and the blower curtain air supply maybe controlled by separate controllers and separate switches such as 71, 72 so that the blower curtain can be left deployed without actuating its air.

Spray Gun

Optionally a Y valve 232 may be provided in hose 164 to take filtered deionized water via a hose to locations remote from the arch. This is particularly useful in car dealerships where scores of cars parked in front of each other restrict access to those cars so they cannot be moved to the arch and the arch cannot be moved to them for washing.

Figure 12:
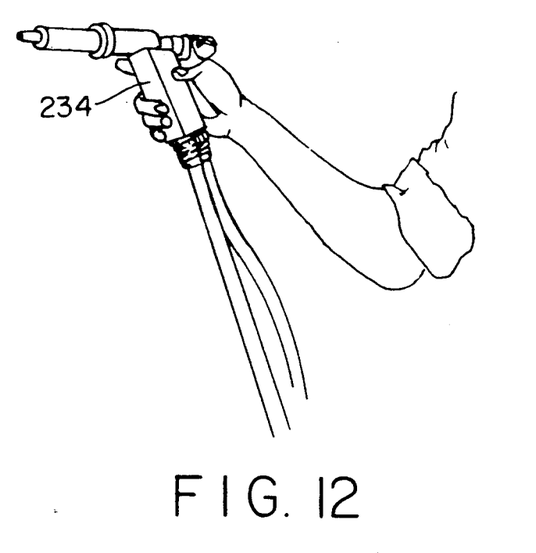
FIG. 12 is a perspective view of an air and deionized water spray gun.

In such circumstances a gun is provided as is shown in FIG. 12. The gun 234 is provided with an air control valve and a water control valve, and it mixes air and water. Thus, the deionized water can be delivered to a remote location with the assistance of air pressure.

Sqeegee

Figure 13:
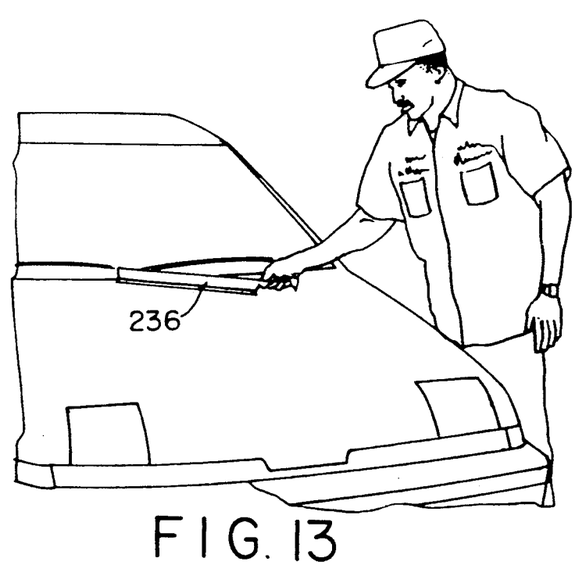
FIG. 13 is a perspective view of a squeegee.
Figure 14:
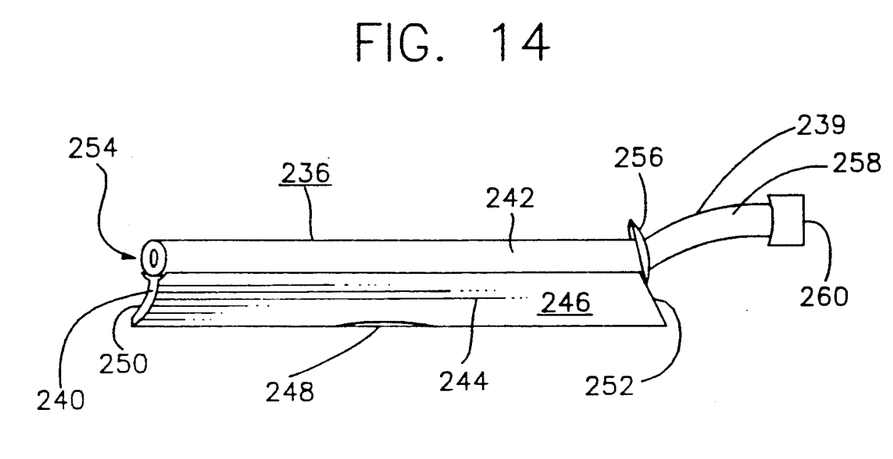
FIG. 14 is a front elevation of the squeegee.
Figure 15:
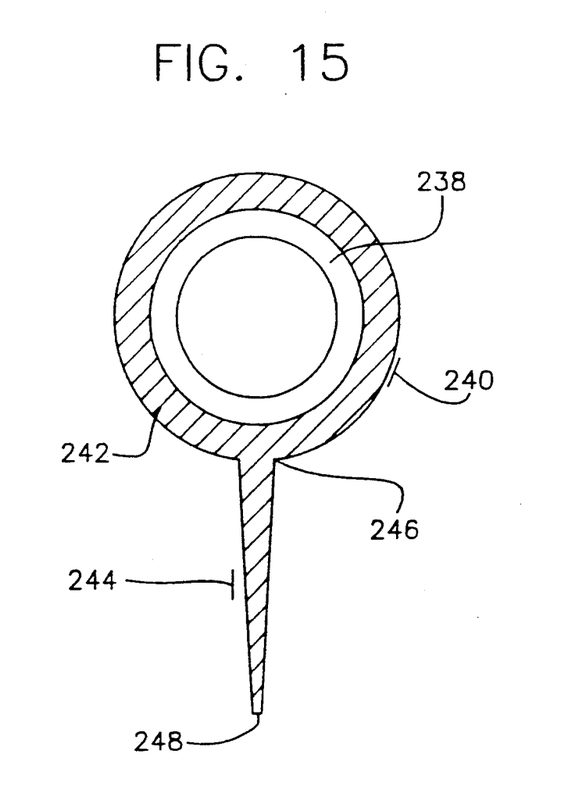
FIG. 15 is a end view elevation of the squeegee with its end cap removed.

Another useful accessory of the present system is a hand-held squeegee 236 as shown in FIG. 13. FIGS. 14 and 15 show this squeegee in better detail. The backbone of the squeegee is an aluminum tube 238, which is ⅜" in its outside diameter and is bent to form an ergonometrically comfortable shape at the handle portion 239 of squeegee 236. About 12" of the aluminum tube are straight and around this portion is slipped a rubber extrusion 240. Extrusion 240 comprises a tubular portion 242 and a blade 244 mounted on a longitudinal line of tube 242's outer surface. Blade 244 tapers from a ¼" thickness at its base 246 to a 1/32" thickness at its edge 248. Given these dimensions it is important to select a rubber or rubber-like material which has the proper stiffness to provide enough flexibility and support to allow the blade to effectively follow the contours of a hood or trunk surface on an automobile. The aluminum tube 238 does not extend to the end of guard extrusion 240 and in the space which is not filled by the aluminum, a rubber tip 254 is inserted to prevent the tubing from coming into contact with any painted surface. At the handle end of the blade, a rubber guard 256 is provided to help prevent water from dripping onto the user's hand. Rubber grip 258 covers the handle portion of the aluminum and rubber end cap 260 covers the handle end. All rubber in the squeegee is of a non-marking type, so it is impossible to marr or scratch a painted finish using this squeegee. Users of this squeegee have been almost universally impressed at its effectiveness in removing water.

High Volume Car Washing

In order to handle increased volume, and where there is sufficient room such as in a commercial car wash, the rack can be set up for continuous straight line operation by dividing it into individual spacially separated tubes.

Figure 16:
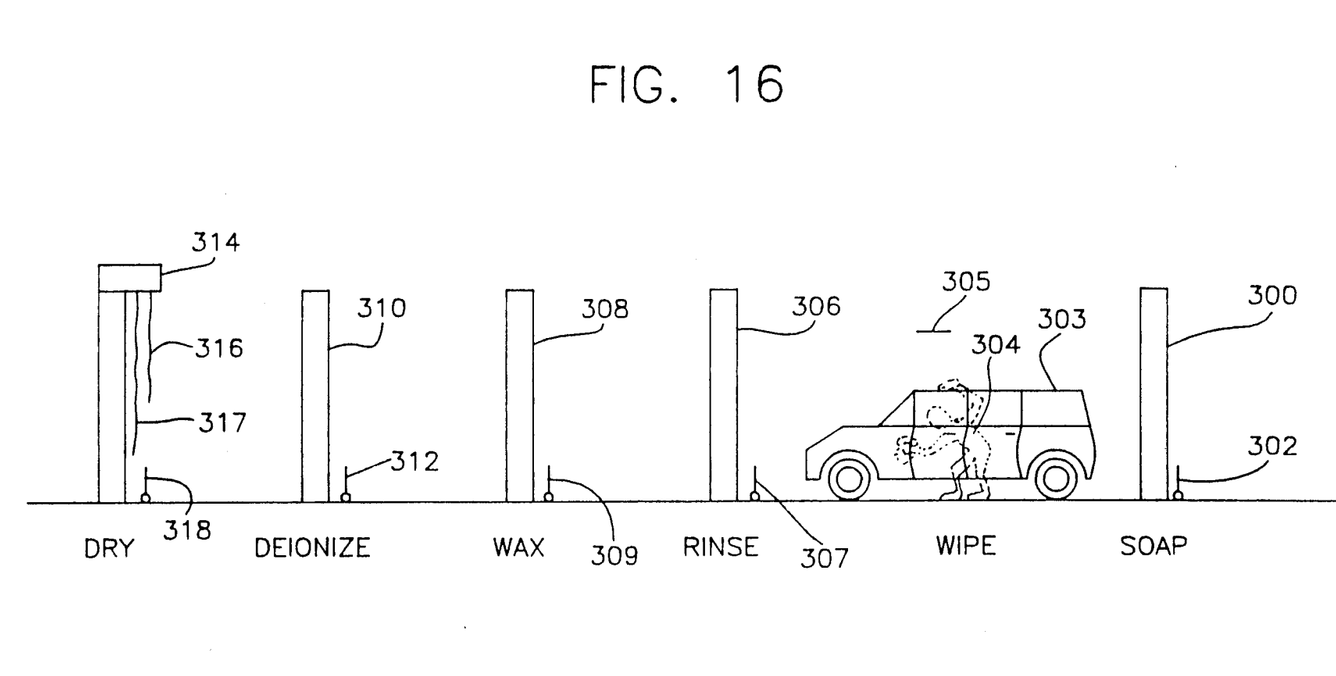
FIG. 16 is a side elevation of the present invention designed for straight-through operation in areas that permit more space to be devoted to washing.

In the high volume location a car 303 approaches rinse station 298 and trips wand 299 actuating a rinse spray. Car 303 next approaches soap station 300 and trips terminal wand 302 actuating the soap spray. The car passes through station 300 to area 305 where a wash person 304 wipes it by hand to break the static adhesion of the dirt. The driver then proceeds through station 306, tripping wand 307, thus actuating the rinse spray from 306. After rinsing, the car is driven through station 308, tripping wand 309 which actuates a wax spray. The car proceeds through dionized rinse station 310 tripping wand 312 to actuate the deionized water spray and from there proceeds through drying station 314. Wand 318 actuates the air spray from tubing 316. Tubing 316 blows high pressure air from its ends, dancing around upon the surface of the car, and blowing and evaporating the water therefrom. Water that is not dispersed in this fashion is absorbed by felt strips 319 and the car is driven out for a final wipe down. A high-pressured gun such as described above can be used at various points in this process to dislodge dirt from hard to reach places.

Figure 17:
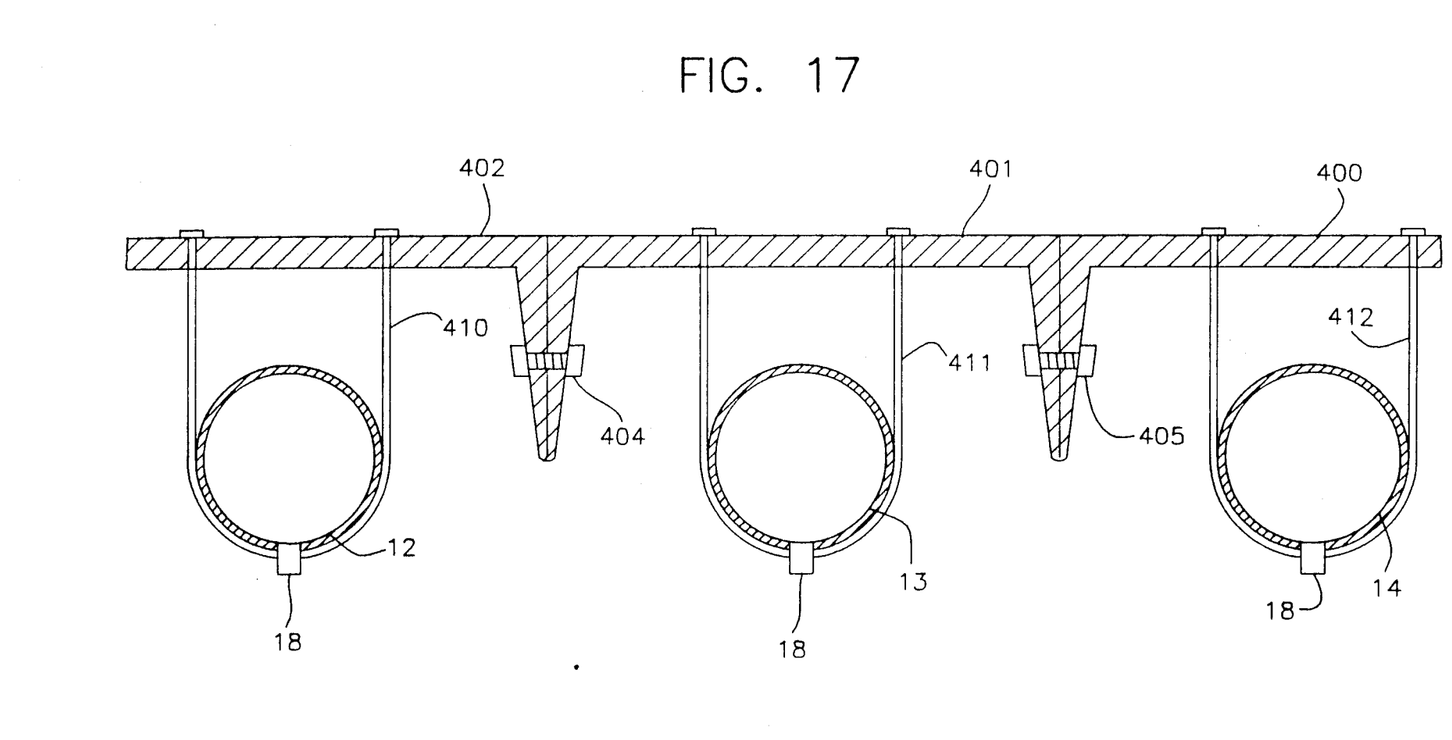
FIG. 17 is a side elevation taken in section of a top portion of the arch.

FIG. 17 shows a typical structure for the arch in cross-section. Channels 400, 401, 402 provide the framework for the arch. These are bolted together by bolts 404, 405. To the inside of these channels U-bolts or straps 410, 411, 412 secure the various spray tubes such as 12, 13, 14. Projecting from the inner-most portion of each tube's surface are a plurality of brass spray nozzles 18 which spray the vehicle. There are generally about twenty-four nozzles per tube, distributed about eight per side, except in the decosmolining rack, where there are eight nozzles along the top, and only one on either side. The cosmoline solvent is very expensive and is thus sprayed on more sparingly.

Figure 18:
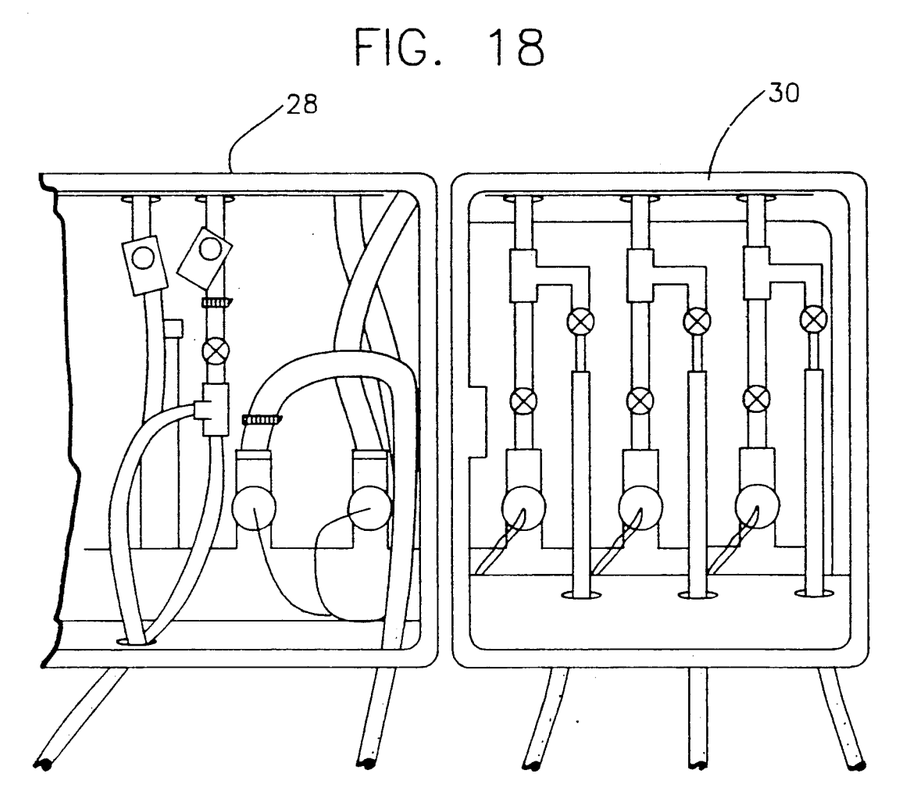
FIG. 18 is a close-up view of the valve control boxes.
Figure 19:
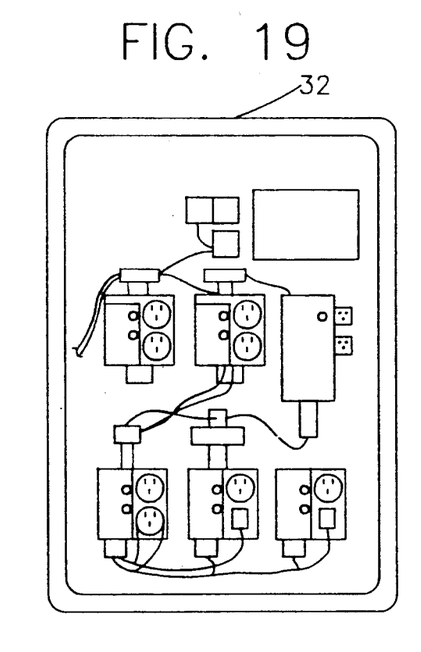
FIG. 19 is a close-up view of the electrical control box.

FIGS. 18 and 19 are presented in order to detail the internal layout of the valve control boxes 28, 30 as shown in FIG. 18 and of the power control box 32 as shown in FIG. 19 in order to better enable one ordinarily skilled in the art to easily fabricate the same.

I claim:

1. An apparatus for assisting in the hand washing of cars comprising a plurality of tubes semi-surrounding a vehicle path, each tube having a plurality of nozzles directed at said vehicle path, separate means for supplying each tube with a respective washing fluid; singular housing means mounting said plurality of tubes in close side-by-side adjacency and actuator means for separately actuating respective ones of said separate supplying means;

said actuator means comprising radio remote control means operable by the person washing the car from within the car for controlling said supplying means;

said plurality of tubes comprising at least three tubes and in which at least three said separate supplying means respectively supply three of said plurality of tubes with water, soapy water and deionized water;

said plurality of tubes further comprising a fourth tube and a fourth separate supplying means which supplies a surfaced sealant from said supplying means;

said plurality of tubes further comprising a fifth tube and a fifth separate supplying means which supplies a solvent such as cosmoline remover from said supplying means;

electronically controlled valve means for directing tap water to one or more of said tubes;

said separated supplying means further comprising tanks in which fluids are directed to said nozzles by the actuation of submersible pumps in said tanks.

2. An apparatus according to claim 1 further comprising means for mixing air with the water and deionized water supplied to said nozzles from said supplying means.

3. An apparatus according to claim 2 wherein said actuator means comprises a radio transmitter capable of actuating a plurality of distinguishable signals:
- a transceiver capable of receiving and distinguishing such plurality of signals;
- a plurality of actuator controllers, each capable of being actuated individually by the transmitter through the transceiver, said actuator controllers each actuating a respective one of said separate supplying means on command of the transmitter.

4. An apparatus according to claim 3 further comprising a first filter comprising a mixed bed of cationic and anionic resin and a second filter similar to the first, said first and second filters comprising means through which tap water is passed for deionizing the tap water.

5. An apparatus according to claim 4 in which the tap water is taken from a reservoir and pressurized by a separate pump.

6. An apparatus according to claim 5 including a power supply to said transceiver, said power supply being regulated by a ground-fault interrupter and a radio interference filter.

7. An apparatus according to claim 6 in which said housing means is mounted on roller means for transporting said apparatus to various laterally and longitudinally spaced locations.

8. An apparatus for assisting in the washing of cars comprising:
- a support structure semi-surrounding a vehicle path;
- a plurality of at least three tubes mounted on said support structure;
- a plurality of nozzles on each said tube, said nozzles directed at said vehicle path;
- means for supplying each said tube with a single fluid from the group consisting of water, soapy water, deionized water, surface sealant and solvent;
- means for actuating said supplying means;
- means for controlling said actuating means by radio remote control from within the car;
- said supplying means comprising:
    - a plurality of tanks;
    - a submersible pump in each said tank, each said pump in fluid communication with its respective tank and with one of said tubes so as to pump said fluid from said tank to said nozzles;
    - each said pump activated by said actuating means.

9. An apparatus according to claim 8 further comprising:
- a plurality of flexible hoses;
- means for suspending said hoses above said vehicle path such that one end of each said hose dangles above said vehicle path;
- means for supplying said hoses with compressed air of a pressure effective in inducing dancing movement in said hoses.

10. An apparatus according to claim 9 further comprising:
- support means for supporting said suspending means;
- said suspending means comprising:
    - a hollow cylinder rotatably mounted on said support means and having an axis of rotation parallel to the curved wall of said cylinder;
    - said axis of rotation above and across said vehicle path;
    - a plurality of rims defining openings in the curved walls of said cylinder;
    - said hoses each having one end attached to the curved wall of said cylinder about one of said rims such that the core of each hose is in gaseous communication with the interior of said cylinder; and
    - wherein the interior of said cylinder is in gaseous communication with said pressurized air supplying means.

* * * * *